United States Patent
Chiueh et al.

(10) Patent No.: US 11,775,643 B2
(45) Date of Patent: Oct. 3, 2023

(54) METHOD AND SYSTEM FOR LABELING OBJECT AND GENERATING SECURITY POLICY OF OPERATING SYSTEM

(71) Applicant: INDUSTRIAL TECHNOLOGY RESEARCH INSTITUTE, Hsinchu (TW)

(72) Inventors: Tzi-Cker Chiueh, Taipei (TW); Yu-Hsuan Wang, New Taipei (TW); Po-Chun Chang, Taipei (TW); Yi-Ting Chao, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 246 days.

(21) Appl. No.: 17/132,622

(22) Filed: Dec. 23, 2020

(65) Prior Publication Data
US 2022/0121745 A1   Apr. 21, 2022

(30) Foreign Application Priority Data

Oct. 16, 2020  (TW) ................................ 109135912

(51) Int. Cl.
*G06F 21/00* (2013.01)
*G06F 21/57* (2013.01)
*G06F 21/62* (2013.01)

(52) U.S. Cl.
CPC .......... *G06F 21/57* (2013.01); *G06F 21/6209* (2013.01); *G06F 21/6218* (2013.01);
(Continued)

(58) Field of Classification Search
CPC .. G06F 21/57; G06F 21/6209; G06F 21/6218; G06F 2221/2141;
(Continued)

(56) References Cited

U.S. PATENT DOCUMENTS

| 9,158,930 | B2 | 10/2015 | Paris |
| 9,641,552 | B2 | 5/2017 | Paris |

(Continued)

FOREIGN PATENT DOCUMENTS

| CN | 102592092 B | 7/2012 |
| CN | 103605920 B | 2/2014 |

(Continued)

OTHER PUBLICATIONS

Chen, Difference between revisions of "SELinux/Tutorials/Controlling file contexts yourself", https://wiki.gentoo.org/index.php?title=SELinux/Tutorials/Controlling_file_contexts_yourself&diff=next&oldid=886578, Aug. 13, 2020 (Year: 2020).*

(Continued)

*Primary Examiner* — Abu S Sholeman
*Assistant Examiner* — Kevin Ayala
(74) *Attorney, Agent, or Firm* — Maschoff Brennan

(57) ABSTRACT

A method for labeling object of operating system is adapted to a target object of a target operating system, wherein the target object has a target attribute. The method comprises: generating a default label by a labeling tool according to the target attribute; obtaining a reference object of a reference operating system, wherein the reference object has a reference attribute and a reference label; comparing whether the target attribute and the reference attribute are identical and generating a comparison result; and labeling the target object with the default label, the reference label, or one of a plurality of candidate labels according to the comparison result and a type of the target object.

12 Claims, 6 Drawing Sheets

(52) U.S. Cl.
CPC ............... *G06F 2221/2141* (2013.01); *G06F 2221/2149* (2013.01)

(58) Field of Classification Search
CPC ......... G06F 2221/2149; G06F 21/6281; G06F 21/51; G06F 8/60
See application file for complete search history.

(56) References Cited

U.S. PATENT DOCUMENTS

| | | | |
|---|---|---|---|
| 10,417,454 B1* | 9/2019 | Marom | G06F 21/57 |
| 2009/0158385 A1 | 6/2009 | Kim et al. | |
| 2012/0066272 A1* | 3/2012 | Drepper | G06F 16/16 707/822 |
| 2014/0075495 A1 | 3/2014 | Paris | |
| 2017/0359341 A1* | 12/2017 | Wurster | G06F 21/6209 |
| 2020/0117817 A1 | 4/2020 | Chen et al. | |

FOREIGN PATENT DOCUMENTS

| | | | |
|---|---|---|---|
| CN | 104951695 A | 9/2015 | |
| CN | 106453413 A | 2/2017 | |
| CN | 107491693 A | 12/2017 | |
| CN | 107908958 A | 4/2018 | |
| CN | 111159713 A | 5/2020 | |
| TW | 201901515 A | 1/2019 | |
| WO | 2019084737 A1 | 5/2019 | |

OTHER PUBLICATIONS

Sandhu et al., "Access control: principle and practice" 1994.
Harada., et al., "Access policy generation system based on process execution history" 2003.
Jaeger et al., "Analyzing Integrity Protection in the SELinux Example Policy" Aug. 2003.
Bugiel et al., "Flexible and fine-grained mandatory access control on Android for diverse security and privacy policies" Aug. 2013.
Sniffen et al., "Guided policy generation for application authors" Feb. 2006.
MacMillan et al., "Madison: a new approach to policy generation" 2007.
Pebenito et al., "Reference policy for security enhanced linux" 2006.
Shabtai, et al., "Securing android-powered mobile devices using selinux" May 2010.
Smalley et al., "Security Enhanced (SE) Android: Bringing Flexible MAC to Android" Apr. 2013.
Vogel et al., "Using SELinux security enforcement in Linux-based embedded devices" Feb. 2008.
TW Office Action dated Jul. 2, 2021 as received in Appliation No. 10/913,5912.

\* cited by examiner

METHOD AND SYSTEM FOR LABELING OBJECT AND GENERATING SECURITY POLICY OF OPERATING SYSTEM

CROSS-REFERENCE TO RELATED APPLICATIONS

This non-provisional application claims priority under 35 U.S.C. § 119(a) on Patent Application No(s). 109135912 filed in Taiwan, ROC on Oct. 16, 2020, the entire contents of which are hereby incorporated by reference.

BACKGROUND

1. Technical Field

This disclosure relates to an information security and is associated with a method for automatically generating the label and the security policy of resources of newly distributed operating system and a system thereof.

2. Related Art

In the field of information security of operating systems, there are operating systems that set security specifications with a label mechanism, such as Linux. SELinux is the access control mechanism of the Linux operating system, which uses a mandatory access control (MAC) model. Compared with the discretionary access control (DAC) model adopted by the traditional Linux operating system, the MAC model is based on the behavior during execution rather than the identity of the executor, so the problem of fraudulent use of identity in the DAC model is solved. All objects in the operating system need to be labeled in order to implement the protection mechanism of the MAC model proposed by SELinux. Further, in order to limit the behavior of system programs, labels are used to generate SELinux policies and rules to describe allowable behaviors of the system program.

When a new operating system distribution is deployed with the SELinux policy, it needs to analyze the source code behavior of many programs manually and then adjusts system settings to conform to the operating process of the new operating system. However, if there are many operating systems need to be deployed and there is only a slight difference between any two different versions of said operating systems, the labor and time costs of the above approach will increase multiplicatively, the possibility of human operation errors may also increase. Therefore, there is an urgent need for an efficient method to support the deployment of SELinux security policies in new operating system distributions.

SUMMARY

In view of the above, the present disclosure proposes methods and systems for labeling object and generating security policy of operating system and thus reducing labor and time costs when deploying a large number of operating system distributions.

According to one or more embodiment of this disclosure, a method for labeling object of operating system adapted to a target object of a target operating system, wherein the target object has a target attribute and the method comprises: generating a default label by a labeling tool according to the target attribute; obtaining a reference object of a reference operating system, wherein the reference object has a reference attribute and a reference label; comparing whether the target attribute and the reference attribute are identical and generating a comparison result; and labeling the target object with the default label, the reference label, or one of a plurality of candidate labels according to the comparison result and a type of the target object.

According to one or more embodiment of this disclosure, a method for generating security policy of operating system adapted a plurality of target objects of a target operating system, wherein each of the target object has a target attribute, and the method comprises: labeling each of the plurality of target objects with the default label, the reference label, or said one of the plurality of candidate label according to the method for labeling object of operating system; performing a booting testing script by the target operating system to generate a plurality of system audit messages; and converting the plurality of system audit messages to a plurality of rules respectively according to a policy generator and collecting the plurality of rules to form a security policy.

According to one or more embodiment of this disclosure, a system of labeling object of operating system adapted to a target object of a target operating system, wherein the target object has a target attribute and the system comprises: a non-transitory machine readable storage medium storing a plurality of instructions; and at least one processing device electrically connecting to the non-transitory machine readable storage medium, wherein said at least one processing device performs the plurality of instructions and triggers a plurality of operations, and the plurality of operations comprises: generating a default label by a labeling tool according to the target attribute; obtaining a reference object of a reference operating system, wherein the reference object has a reference attribute and a reference label; comparing whether the target attribute and the reference attribute are identical and generating a comparison result; and labeling the target object with the default label, the reference label, or one of a plurality of candidate labels according to the comparison result and a type of the target object.

According to one or more embodiment of this disclosure, a system for generating security policy of operating system adapted a plurality of target objects of a target operating system, wherein each of the target object has a target attribute, and the system comprises: a non-transitory machine readable storage medium storing a plurality of instructions; and at least one processing device electrically connecting to the non-transitory machine readable storage medium, wherein said at least one processing device performs the plurality of instructions and triggers a plurality of operations, and the plurality of operations comprises: generating a default label by a labeling tool according to the target attribute; obtaining a reference object of a reference operating system, wherein the reference object has a reference attribute and a reference label; comparing whether the target attribute and the reference attribute are identical and generating a comparison result; labeling each of the plurality of target objects with the default label, the reference label, or one of a plurality of candidate labels according to the comparison result and a type of the target object; performing a booting testing script by the target operating system to generate a plurality of system audit messages; and converting the plurality of system audit messages to a plurality of rules according to a policy generator and collecting the plurality of rules to form a security policy.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for labeling objects of operating system and the method for generating a security policy of operating system proposed in the present disclosure are adapted target objects of a target operating system. The target operating system, or known as the target distribution (TD), refers to the operation system that will be deployed on a large amount of devices. The target operating system comprises a plurality of target objects. The operating system is such as Unix, Linux, Ubunto, or any operating system which has objects that can be labeled for security. However, the present disclosure does not limit to the above example. The security policy is such as SELinux, AppArmour, or SMACK, the present disclosure does not limit the type of the security policy, and SELinux is taken as an example for the following description. The target objects are files in a file system, including multiple types such as a normal file, a link file, a socket file, a pipe file, a block file, a character file, a directory, an executable file (program). The present disclosure does not limit that the method for labeling objects of operating system can be applied to generate the operating system's security policy only. For example, the present disclosure may applied to general Linux operating system distributions, such as Ubuntu, Debian, and Raspbian, or to the Internet of Things (IoT) such as Raspbian, OpenWRT, busybox, yocto and other Netcom related product devices (router, camera or firewall)

Figure 1:
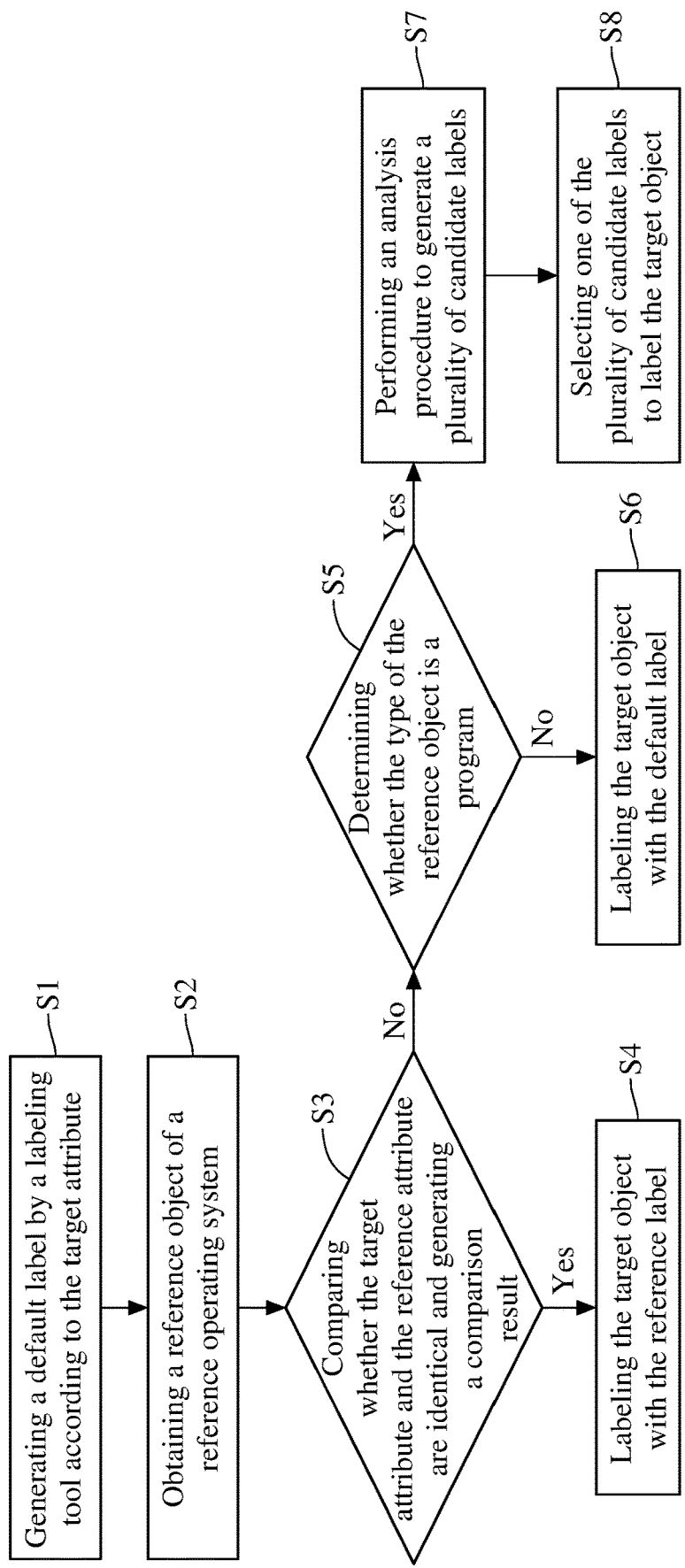
FIG. 1 is a flowchart of an embodiment of the method for labeling objects of operating system.

FIG. 1 is a flowchart of an embodiment of the method for labeling objects of operating system. Step S1 shows "generating a default label by a labeling tool according to the target attribute".

Before step S1, the present disclosure has to install tools of an open-source project, Refpolicy, in the target operating system, wherein said tools are configured to generate a SELinux policy, and comprise: a labeling tool (setfiles), a label database (file_contexts), a policy compiler (checkpolicy), a policy convertor (audit2allow), and libraries for SELinux operations such as libselinux, libsepool, and libsemanage.

The labeling tool, setfile, is applied together with the label database (file_contexts). The target attribute is such as a file path, a file name, or a file type. In step S1, the target attribute means the file path of the target object. The label database (file_contexts) records a regular expression of the file path and a corresponding label. Please refer to table 1, which lists a part of label database (file_contexts) in a table form, wherein each row comprises a regular expression of the file path (e.g. /mnt([^/]) in the second row), a file type (e.g. "−1" in the second row), and a label (e.g. system_u:object r:mnt_t in the second row). Therefore, based on the file path of each target object of the target operating system, step S1 searches the label database (file_contexts) to obtain a default label corresponding to this file path. For example, a directory located under "/mnt/" will be labeled with "system_u:object r:mnt_t".

TABLE 1

...
/mnt(/[^/]*) -l system_u:object_r:mnt_t
/mnt(/[^/]*)? -d system_u:object_r:mnt_t
/dev/.* system_u:object_r:device_t
/etc/.* system_u:object_r:etc_t
/opt/.* system_u:object_r:usr_t
...

Step S2 shows "obtaining a reference object of a reference operating system". Step S3 shows "comparing whether the target attribute and the reference attribute are identical and generating a comparison result". The reference object described in step S2 has a reference attribute and a reference label, the reference attribute is, for example, at least one of file path, file name, and file type. In an embodiment, the target operating system is Ubunto and the reference operating system is Debian. In steps S2 and S3, a source operating system (source distribution, SD) that has been completely deployed with a SELinux environment may be adopted by the present disclosure to serve as a template. The present disclosure uses file paths and file types of both target and reference operating systems as the basis of comparison, and labels the resource of the target operating system with a consistent label when the target object of the target operating system corresponds to the reference object of the reference operating system.

Figure 2:
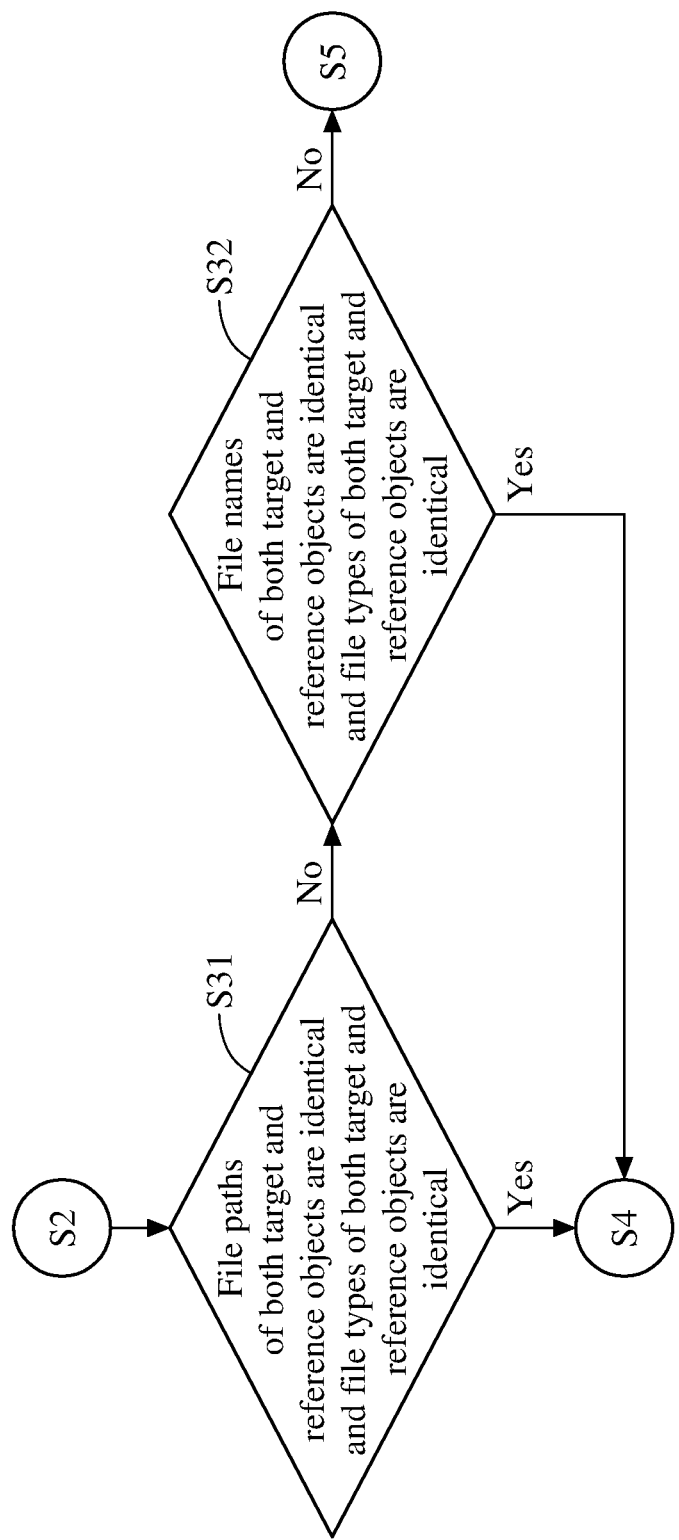
FIG. 2 is a detailed flowchart of an example of step S3 of FIG. 1.

FIG. 2 is a detailed flowchart of an example of step S3 of FIG. 1. Step S31 shows "determining whether file paths of both target and reference objects are identical and whether file types of both target and reference objects are identical". In other words, step S31 determines whether the target objects and the reference objects are located in the same file path and have the same file type. If the determination result of step S31 is positive, it means that the comparison result of step S3 indicates that target attribute and the reference attribute are identical, and step S4 is then performed. Step S4 shows "labeling the target object with the reference label".

An example of the process of steps S31-S4 is given below: in step S31, the target operating system performs a remote command through a cryptographic network protocol, secure shell (SSH), and sends the file path of the target object to the reference operating system. The reference operating system receives this file path and uses a "file" command to search the file system of the reference operating system to determine whether there is a corresponding reference object under the file path. If a reference object was found in the reference operating system according to the file path of the target operating system, the reference operating system sends, to the target operating system, the reference label of this reference object and sends the file type of this reference object in an internet media type (MIME type). The target operating system determines whether the file type of the reference object is identical to the file type of the target object. If the determination result is positive, the target operating system labels the target object with the reference label received from the reference operating system. If the determination result is negative, the target operating system drops this reference label without labeling the target object.

In view of the above, when the determination result of step S31 is negative, it means that the comparison result of step S3 indicates that the target attribute and the reference attribute are different. Here the target attribute and the reference attribute specify the file path and the file type. Considering the condition that files of the same file name may locate in different path, the process moves to step S32, which shows "determining whether file names of both target and reference objects are identical and whether file types of both target and reference objects are identical". If the determination result of step S32 is positive, it means that the reference object has a reference object similar to the target object; however, this reference object's file path in the reference operating system is different from the target object's file path in the target operating system. In such condition, the present disclosure may still label the target object with the reference label of the reference object, and the process moves to step S4.

In practice, the foregoing example of the process of steps S31-S4 may be modified to make it adapted to the process of steps S32-S4.

If the determination result of step S32 is negative, it means that in terms of file name and file path, there is no reference object in the reference operating system that correspond to the target object. Therefore, the present disclosure further considers that, in the reference operating system, whether there is a reference object whose content is similar to the content of the target operating system. For example, if the target object is an executable file (program), the reference operating system may have a reference object whose behavior is similar to the behavior of the target object. Therefore, the process returns to step S5 of FIG. 1. Step S5 shows "determining whether the type of the reference object is program".

If the target file is a normal file and there is no result after the comparison is performed according to the file name and the file type of the target object, it should be determined that the reference operating system has no reference object that is similar to the target object. Therefore, if the determination result of step S5 is negative, it means that the type of the target object is not program and the process moves to step S6, "labeling the target object with the default label".

If the determination result of step S5 is positive, it means that the type of the target object is program and the process moves to step S7, "performing an analysis procedure to generate a plurality of candidate labels".

Figure 3:
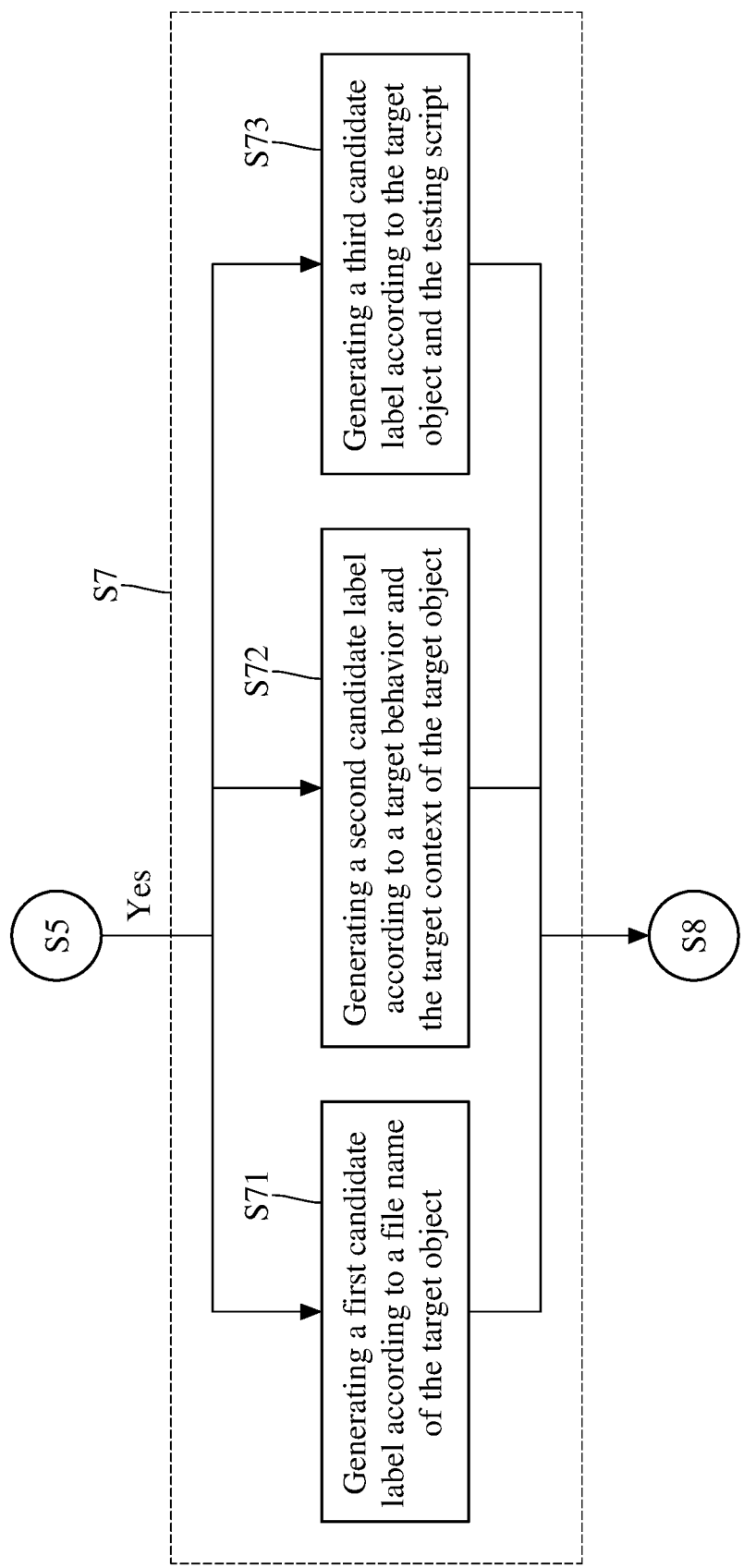
FIG. 3 is a detailed flowchart of an example of step S7 of FIG. 1.

FIG. 3 is a detailed flowchart of an example of step S7 of FIG. 1. However, before introducing step S7, the preparing tasks are explained in detail first. Specifically, before performing the analysis procedure, the following two preparation tasks must be completed, but the present disclosure does not limit the sequence of performing these two preparation tasks.

The first preparing task is "labeling, each second target object with a second default label by the labeling tool". The previous paragraph describes that the target operating system has a target object, and this target object is called the first target object. In practice, an operating system such as Ubunto has a plurality of target objects, and each of these target objects except the first target object is call the second object. The label of the first target object generated by the labeling tool is called the first default label, and the label of the second target object generated by the labeling tool is called the second default label. One purpose of the present disclosure it to generate the most suitable label for each target object of the target operating system. Therefore, as long as the condition, "preparing task is completed before step S7", is satisfied, the first preparation work can be completed at step S1, and the present disclosure is not limited thereto.

The second preparing task is "analyzing a behavior datum of each second target object" and "establishing a behavior database according to a plurality of file names of the plurality of second target objects, the plurality of second default labels and the plurality of behavior data". The behavior datum is configured to record one or more program behaviors. In practice, the behavior datum refers to the symbol or the metadata of the file. The behavior datum of each target object of the target operating system may be obtained by tools such as readelf or objdump, and then the behavior database (symbol database) is established according to file names of the second target objects, second default labels and the behavior data of second target objects. The behavior database is configured to provide a corresponding second default label of the target object according to the file name or the behavior datum of the target object. The second preparing task has to be finished before step S7; however, the present disclosure does not limit the timing of its completion.

Please refer to step S7 of FIG. 1 and FIG. 3. The analysis procedure comprises a static stage and a dynamic stage. The static stage comprises steps S71 and S72. The dynamic stage comprises steps S73. It should be noticed that the present disclosure does not limit the performing order of steps S71-S73.

For a further understanding of the detailed process after step S7, waterfox, a third-party open source web browser developed based on Mozilla Firefox, will be used as an example of the target object whose file type belongs to program.

Step S71 shows "generating a first candidate label according to a file name of the target object". Step S71 and step S1 are basically identical, and the difference is that step S1 searches, by the labeling tool, the label database (file_contexts) according to the file path of the target object, such as "/home/username/waterfox", to obtain the first default label, while step S71 searches, by the labeling tool, the label database (file_contexts) according to the file name of the target object, such as "waterfox", to obtain the first default label.

Figure 4:
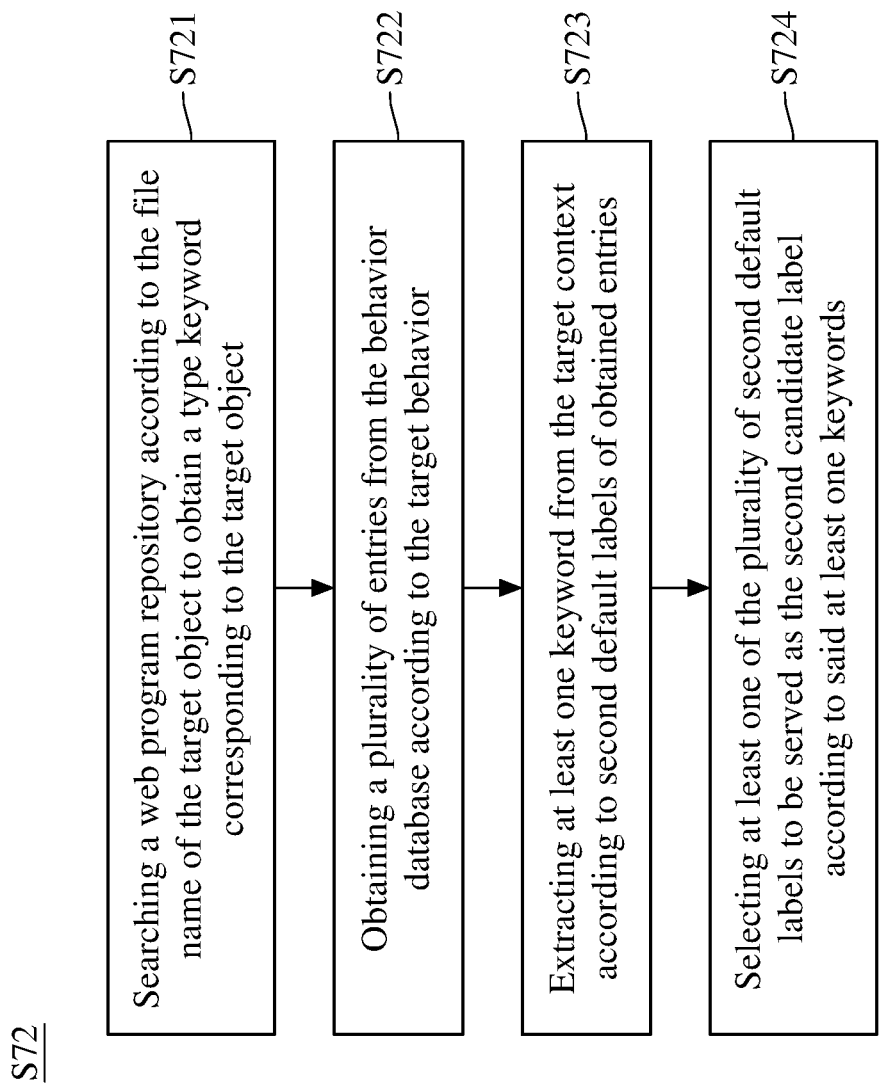
FIG. 4 is a detailed flowchart of an example of step S72 of FIG. 3.

Step S72 shows "generating a second candidate label according to a target behavior and the target context of the target object". The present disclosure obtains the target behavior of the target object through tools such as readelf or objdump in step S72, and this is similar to the aforementioned method of analyzing the behavior data of each second target object. Furthermore, the present disclosure uses a tool "string" to obtain the target context of the target object. The target context refers to printable characters in the target object. In short, in the target operating system, step S72 finds one or more second target objects whose behaviors and context keywords are similar to those of the first target object. FIG. 4 is a detailed flowchart of an example of step S72 of FIG. 3.

Step S721 shows "searching a web program repository according to the file name of the target object to obtain a type keyword corresponding to the target object". For example, step S721 searches the keyword "waterfox" in web program repositories respectively maintained by Arch User Repository (AUR) or Gentoo community and obtains type keywords such as "browser", "firefox", "waterfox" and "web". In step S721, the label database (file_contexts) having a large number of entries can be filtered according to the program type (type keyword) of the target object in advance to reduce the amount of subsequent calculation and search. In other embodiment, step S721 may be skipped and the present disclosure does not limit thereto.

Step S722 shows "obtaining a plurality of entries from the behavior database according to the target behavior". The behavior data of each of the plurality of entries is identical to the target behavior. From another perspective, step S722 finds one or more second target objects in the target operating system, and each of these behavior data is similar to the target behavior of the first target object. For example, two second target objects such as "firefox" and "chrome" may be found in step S722. Because programs such as waterfox, firefox and chrome belong to browsers and therefore have similar file access behaviors or network access behaviors.

Step S723 shows "extracting at least one keyword from the target context according to second default labels of obtained entries", wherein said at least one keyword is identical to one of the plurality of second default labels of the plurality of entries. For example, a second target object "firefox" comprises two second default labels, "mozilla_exec_t" and "mozilla_t", and another second target object "chrome" comprises two second default labels, "google_exec_t", "google_t". Step S723 uses a part of the second default label corresponding to the second target object as a comparing string, and determines that whether a keyword identical to this comparing string exists in the target context of the first target object. In order to improve the probability of finding keywords in the target context, the present disclosure ignores the non-searchable strings in the second default label, such as "_t", and only uses strings such as "mozilla", "mozilla_exec", "google", and "google_exec" to serve as comparing strings. In general, the naming of a label is highly related to the file names and the file sources. In addition, when using the string tool to check the printable characters of the first target object waterfox, there is a high probability of finding the keywords of the related program, which is "mozilla" of firefox.

Step S724 shows "selecting at least one of the plurality of second default labels to be served as the second candidate label according to said at least one keywords". For example, the keyword extracted in step S723 is "mozilla", so two second default labels "mozilla_exec_t" and "mozilla_t" corresponding the keyword are set as the second candidate labels.

As described above, the analysis procedure generates the first candidate label and the second candidate label in the static stage (steps S71 and S72). It should be noticed that the present disclosure does not limit the number of the first and second candidate labels.

Figure 5:
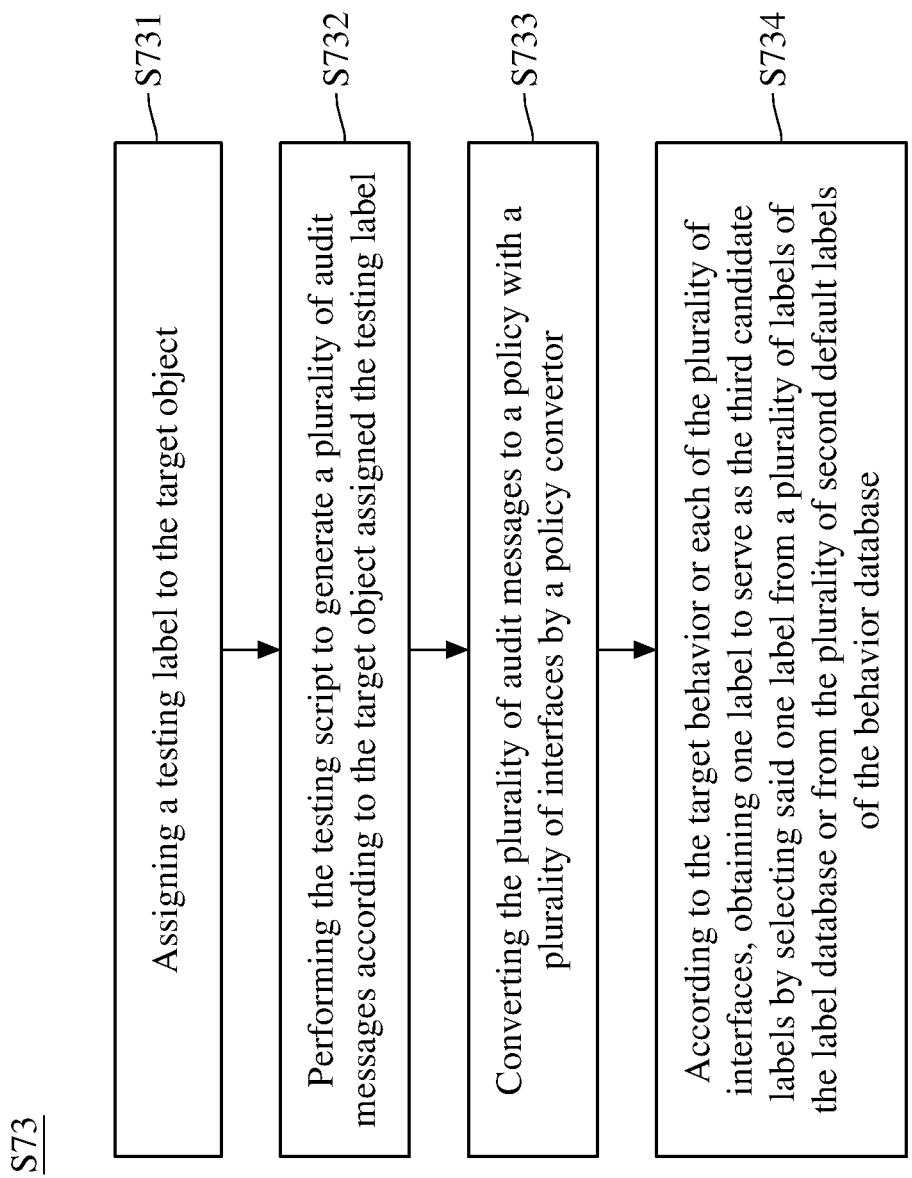
FIG. 5 is a detailed flowchart of step S73 of FIG. 3.

Please return step S73 of FIG. 3, which shows "generating a third candidate label according to the target object and the testing script". Because the target object belongs to an executable program, the step S73 uses the information obtained by performing the testing script with the target object to generate the third candidate label. FIG. 5 is a detailed flowchart of step S73 of FIG. 3.

Step S731 shows "assigning a testing label to the target object". For example, the testing label "test_t" is assigned to waterfox.

Step S732 shows "performing the testing script to generate a plurality of audit messages according to the target object assigned the testing label". The testing script is configured to simulate various operations when user runs the waterfox. Because the security policy corresponding to this testing label "test_t" has not been established in the target operating system, in the process performing the testing script, the kernel of the operating system may output a plurality of audit message to report those prohibited behaviors during waterfox is performed.

Step S733 shows "converting the plurality of audit messages to a policy with a plurality of interfaces by a policy convertor". In practice, the present disclosure uses the policy convertor "audit2allow" to perform the conversion of step S733.

Step S734 shows "according to the target behavior or each of the plurality of interfaces, obtaining one label to serve as the third candidate labels by selecting said one label from a plurality of labels of the label database or from the plurality of second default labels of the behavior database". In an embodiment, each label of the label database (file_contexts) corresponds to an interface. In another embodiment, the second default label of the behavior database not only corresponds to behavior data but also corresponds to an interface. Therefore, based on the plurality of behaviors generated during the target object is actually performed step S734 determines the third candidate label suitable for these behaviors. The third candidate label may be obtained from the label database or from the behavior database.

Please refer to step S8 of FIG. 1, which shows "selecting one of the plurality of candidate labels to label the target object". In the first example of step S8, the present disclosure use "sesearch" command to respectively calculate a first accessed number corresponding to the first candidate label generated in the static stage, a second accessed number corresponding to the second candidate label, and a third accessed number corresponding to the third candidate label generated in the dynamic stage. When the target object is assigned with a certain candidate label, the number of processes allowable to access this target object is called the accessed number in rules of current policy. The present disclosure specifies that the candidate label with the smallest accessed number may be used to label the target object.

In a second example of step S8, if the analysis procedure found a suitable third candidate label in the dynamic state, this third candidate label may be used to label the target object. Because the present disclosure performs the testing program (target object) actually according to the testing script in step S732 and obtains the plurality of interfaces in step S733, regarding the target object, the third candidate label obtained from actual testing is more accurate than the second candidate label obtained by performing the keyword comparison according to the target context and the target behavior. However, if the analysis procedure did not find any third candidate label in the dynamic stage, the present disclosure may select one of the first candidate label and the second candidate label to label the target object, and the selection method may use "sesearch" command to find the smallest accessed number as described in previous example.

Figure 6:
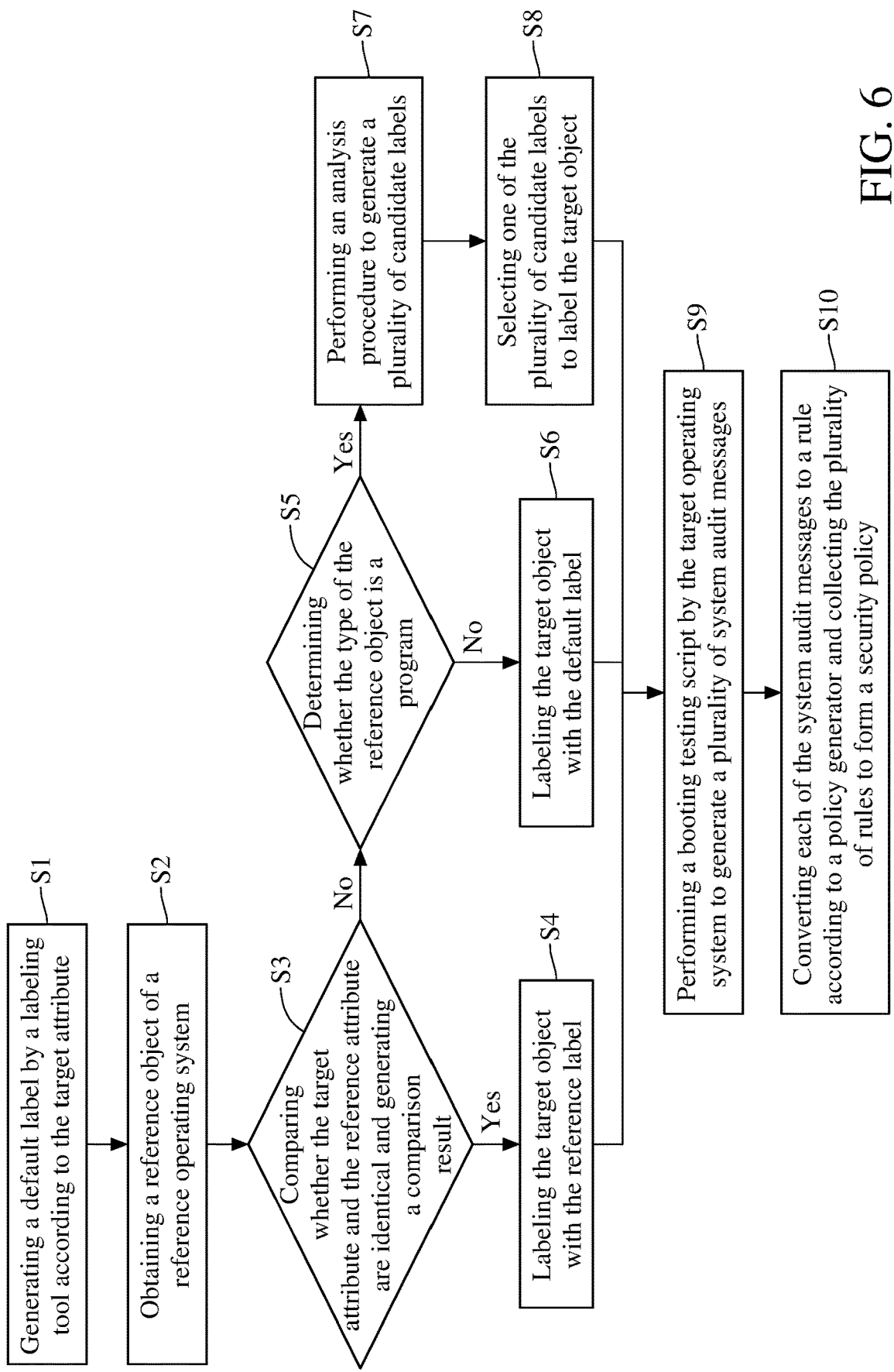
FIG. 6 is a flowchart of an embodiment of the method for generating security of operating system.

In view of the above, the present disclosure proposes a method for labeling object of operating system may generate suitable label for every target object of the target operating system. FIG. 6 is a flowchart of an embodiment of the method for generating security of operating system. In FIG. 6, the process of steps S1-S8 is identical to that of FIG. 4 and will not be repeated here. Regarding every target object, one of steps S4, S6, and S8 will be performed lastly in the process shown in FIG. 1. In other words, the target object may be labeled with a reference label obtained from the reference operating system, a default label obtained from the Refpolicy, or a candidate label obtained from the analysis procedure according to its property.

From the perspective of generating the security policy of the operating system, the process of steps S1-S8 may be referred to as a static phase, and the process of steps S9-S10 may be referred to as a dynamic phase.

Step S9 shows "performing a testing script during booting by the target operating system to generate a plurality of system audit messages". The booting testing script generally refers to a system program testing script configured after analyzing system boot behavior and system program behavior. The booting testing script comprises behaviors of all programs performed during the booting time, the resources used by these programs, and the booting testing script also selectively stores behaviors of specific programs and resources used by these specific programs, wherein said specific programs are performed by the user after booting. In other words, one of the program behaviors described previously corresponds to a program of system kernel mode or another program of system user mode. When the target operating system reboots for the first time and performs the booting testing script, since a complete security policy has not been established, a large amount of accessing behavior is blocked by a default security policy, and SELinux generates multiple system audit messages after the examination. These system audit message will be stored in a log file in step S9. The following table 2 is an example of the log file. This log file comprises a plurality of labels when steps S4, S6, and S8 are performed for labeling the target objects.

TABLE 2

Jul 06 20:06:03 ubuntu audit[1553]: AVC avc: denied { search } for pid=1553 comm="dconf-service" name="/" dev="tmpfs" ino=2 scontext=system_u:system_r:system_dbusd_t tcontext=unconfined_u:object_r:user_runtime_t tclass=dir permissive=1
Jul 06 20:06:03 ubuntu audit[1553]: AVC avc: denied { read } for pid=1553 comm="dconf-service" name="user" dev="tmpfs" ino=34 scontext=system_u:system_r:system_dbusd_t tcontext=unconfined_u:object_r:user_tmp_t tclass=file permissive=1
Jul 06 20:06:03 ubuntu audit[1553]: AVC avc: denied { open } for pid=1553 comm="dconf-service" path="/run/user/1000/dconf/user" dev="tmpfs" ino=34 scontext=system_u:system_r:system_dbusd_t tcontext=unconfined_u:object_r:user_tmp_t tclass=file permissive=1

Step S10 shows "converting each of the system audit messages to a rule according to a policy generator and collecting the plurality of rules to form a security policy". Specifically, based on the system audit messages stored in the log file, the present disclosure uses the tool "audit2allow" to convert every system audit message to a corresponding rule. For example, the table 2 may be converted into three rule as listed in the following table 3.

Table 3

In practice, the present disclosure repeatedly performs step S10 until all system audit messages are converted into rules. These rules are collected in step S10. In an embodiment, the present disclosure selects another booting testing script and repeatedly reboots for performing the process of steps S9-S10 and then a complete security policy can be generated.

allow system_dbusd_t user_runtime_t:dir { search };
allow system_dbusd_t user_tmp_t:dir { read };
allow system_dbusd_t user_tmp_t:dir { open };

According to one or more embodiments of the present disclosure, a system of labeling object of operating system is adapted to a target object of a target operating system, wherein the target object has a target attribute and the system comprises a non-transitory machine readable storage medium storing a plurality of instructions; and at least one processing device electrically connecting to the non-transitory machine readable storage medium, wherein said at least one processing device performs the plurality of instructions and triggers a plurality of operations, and the plurality of operations comprises: generating a default label by a labeling tool according to the target attribute; obtaining a reference object of a reference operating system, wherein the reference object has a reference attribute and a reference label; comparing whether the target attribute and the reference attribute are identical and generating a comparison result; and labeling the target object with the default label, the reference label, or one of a plurality of candidate labels according to the comparison result and a type of the target object.

According to one or more embodiments of the present disclosure, in the plurality of operations performed by the system of labeling object of operating system, labeling the target object with the default label, the reference label, or said one of a plurality of candidate labels according to the comparison result and the type of the target object comprises: labeling the target object with the reference label when the comparison result shows that the target attribute and the reference attribute are identical; determining whether the type of the target object is program when the comparison result shows that the target attribute and the reference attribute are different; labeling the target object with the default label when the type of the target object is not program, performing an analysis procedure to generate the plurality of candidate labels when the type of the target object is program, and labeling the target object with said one from the plurality of candidate labels according to an accessed number corresponding to each of the plurality of candidate labels.

According to one or more embodiments of the present disclosure, a system for generating security policy of operating system is adapted a plurality of target objects of a target operating system, wherein each of the target object has a target attribute, and the system comprises: a non-transitory machine readable storage medium storing a plurality of instructions; and at least one processing device electrically connecting to the non-transitory machine readable storage medium, wherein said at least one processing device performs the plurality of instructions and triggers a plurality of operations, and the plurality of operations comprises: generating a default label by a labeling tool according to the target attribute; obtaining a reference object of a reference operating system, wherein the reference object has a reference attribute and a reference label; comparing whether the target attribute and the reference attribute are identical and generating a comparison result; labeling each of the plurality of target objects with the default label, the reference label, or one of the plurality of candidate label according to the comparison result and a type of the target object; performing a booting testing script by the target operating system to generate a plurality of system audit messages; and converting each of the system audit messages to a rule according to a policy generator and collecting the plurality of rules to form a security policy.

According to one or more embodiments of the present disclosure, in the plurality of operations performed by the system for generating security policy of operating system, labeling the target object with the default label, the reference label, or said one of a plurality of candidate labels according to the comparison result and the type of the target object comprises: labeling the target object with the reference label when the comparison result shows that the target attribute and the reference attribute are identical; determining whether the type of the target object is program when the comparison result shows that the target attribute and the reference attribute are different; labeling the target object with the default label when the type of the target object is not program, performing an analysis procedure to generate the plurality of candidate labels when the type of the target object is program, and labeling the target object with said one from the plurality of candidate labels according to an accessed number corresponding to each of the plurality of candidate labels.

In view of the above, the present disclosure provides methods and systems for labeling object and generating security policy of operating system.

The provided methods may be automatically performed so that the distribution of the operating system satisfying any environment requirement may be rapidly deployed. The operating system adopt the label mechanism to configure a security rule. In the past, manually analyzing behaviors of system programs and configuring security policies bring high labor cost and high time cost. The feature of the present disclosure is that when a new Linux version is released, the security policy of the existing version can be referenced and reused. Therefore, it is only necessary to completely set labels to all resources of the current target operating system, the security policy support issues may be solved in an automatic manner, and the required security policies are generated through the policy convertor "audit2allow", so as to quickly support a new Linux distribution. For hardware platforms that require a large number of different Linux distributions in the Internet of Things (IoT), smart manufacturing, and industrial control fields, methods and systems for labeling object and generating security policy of operating system proposed by the present disclosure may shorten the time for large-scale deployment and reduce labor costs.

What is claimed is:

1. A method for labeling object of operating system adapted to a target object of a target operating system, wherein the target object has a target attribute and the method comprises:
    generating a default label by a labeling tool according to the target attribute;
    obtaining a reference object of a reference operating system, wherein the reference object has a reference attribute and a reference label;
    comparing whether the target attribute and the reference attribute are identical and generating a comparison result; and
    labeling the target object with the default label, the reference label, or one of a plurality of candidate labels according to the comparison result and a type of the target object;
    wherein labeling the target object with the default label, the reference label, or said one of the plurality of candidate labels according to the comparison result and the type of the target object comprises:
    labeling the target object with the reference label when the comparison result shows that the target attribute and the reference attribute are identical;
    determining whether the type of the target object is program when the comparison result shows that the target attribute and the reference attribute are different;
    labeling the target object with the default label when the type of the target object is not program; and
    performing an analysis procedure to generate the plurality of candidate labels when the type of the target object is program, and selecting said one of the plurality of candidate labels according to an accessed number corresponding to each of the plurality of candidate labels to label the target object;
    wherein the target object is a first target object, the default label is a first default label, the target operating system further comprises a plurality of second target objects, and
    before performing the analysis procedure, the method further comprises:
    labeling the plurality of second target objects with a plurality of second default labels respectively by the labeling tool;
    analyzing a plurality of behavior data of the plurality of second target objects respectively; and
    establishing a behavior database according to a plurality of file names of the plurality of second target objects, the plurality of second default labels and the plurality of behavior data; and
    the analysis procedure comprises a static stage and a dynamic stage, wherein
    the static stage comprises:
    generating a first candidate label according to a file name of the target object; and
    generating a second candidate label according to a target behavior and a target context of the target object; and
    the dynamic stage comprises:
    generating a third candidate label according to the target object and a testing script;
    wherein generating the second candidate label according to the target behavior and the target context of the target object comprises:
    obtaining a plurality of entries from the behavior database according to the target behavior, wherein the behavior data of each of the plurality of entries is identical to the target behavior;
    extracting at least one keyword from the target context according to the plurality of second default labels of the plurality of entries, wherein said at least one keyword is identical to one of the plurality of second default labels of the plurality of entries; and
    selecting at least one of the plurality of second default labels to be served as the second candidate label according to said at least one keyword.

2. The method for labeling object of operating system of claim 1, wherein each of the target attribute and the reference attribute is at least one of a file path, a file name and a file type.

3. The method for labeling object of operating system of claim 1, wherein generating the first candidate label according to the file name of the target object comprises: searching, by the labeling tool, a label database according to the file name to obtain a first candidate label.

4. The method for labeling object of operating system of claim 1, wherein
    before generating the second candidate label according to the target behavior and the target context of the target object, the method further comprises:
    searching a web program repository according to the file name of the target object to obtain a type keyword corresponding to the target object; and before obtaining the plurality of entries from the behavior database according to the target behavior, the analysis procedure further comprises:
filtering the behavior database according to the type keyword corresponding to the target object.

5. The method for labeling object of operating system of claim 1, wherein generating the third candidate label according to target object and the testing script comprises:
assigning a testing label to the target object;
performing the testing script to generate a plurality of audit messages according to the target object assigned the testing label;
converting the plurality of audit messages to a policy with a plurality of interfaces by a policy convertor; and
according to the target behavior or each of the plurality of interfaces, obtaining one label to serve as the third candidate label by selecting said one label from a plurality of labels of a label database or from the plurality of second default labels of the behavior database, wherein the plurality of labels of the label database corresponds to the plurality of interfaces respectively, or the plurality of behavior data corresponds to the plurality of interfaces respectively.

6. A method for generating security policy of operating system adapted a plurality of target objects of a target operating system, wherein each of the target object has a target attribute, and the method comprises:
labeling each of the plurality of target objects with the default label, the reference label, or said one of the plurality of candidate label according to the method for labeling object of operating system of claim 1;
performing a booting testing script by the target operating system to generate a plurality of system audit messages; and
converting the plurality of system audit messages to a plurality of rules respectively according to a policy generator and collecting the plurality of rules to form a security policy.

7. The method for generating security policy of operating system of claim 6, wherein the booting testing script comprises a plurality of program behaviors corresponding to a plurality of programs of the target operating system and a plurality of sources used by the plurality of programs.

8. The method for generating security policy of operating system of claim 7, wherein one of the plurality of program behaviors corresponds to a program of system kernel mode.

9. The method for generating security policy of operating system of claim 7, wherein one of the plurality of program behaviors corresponds to a program of system user mode.

10. The method for generating security policy of operating system of claim 6, before collecting the plurality of rules to form the security policy, further comprising: repeatedly performing the booting testing script by the target operating system until target operating system does not generate any system audit messages.

11. A system of labeling object of operating system adapted to a target object of a target operating system, wherein the target object has a target attribute and the system comprises:
a non-transitory machine readable storage medium storing a plurality of instructions; and
at least one processing device electrically connecting to the non-transitory machine readable storage medium, wherein said at least one processing device performs the plurality of instructions and triggers a plurality of operations, and the plurality of operations comprises:

generating a default label by a labeling tool according to the target attribute;
obtaining a reference object of a reference operating system, wherein the reference object has a reference attribute and a reference label;
comparing whether the target attribute and the reference attribute are identical and generating a comparison result; and
labeling the target object with the default label, the reference label, or one of a plurality of candidate labels according to the comparison result and a type of the target object;
wherein labeling the target object with the default label, the reference label, or said one of the plurality of candidate labels according to the comparison result and the type of the target object comprises:
labeling the target object with the reference label when the comparison result shows that the target attribute and the reference attribute are identical;
determining whether the type of the target object is program when the comparison result shows that the target attribute and the reference attribute are different;
labeling the target object with the default label when the type of the target object is not program; and
performing an analysis procedure to generate the plurality of candidate labels when the type of the target object is program, and selecting said one of the plurality of candidate labels according to an accessed number corresponding to each of the plurality of candidate labels to label the target object;
wherein the target object is a first target object, the default label is a first default label, the target operating system further comprises a plurality of second target objects, and
before performing the analysis procedure, the method further comprises:
labeling the plurality of second target objects with a plurality of second default labels respectively by the labeling tool;
analyzing a plurality of behavior data of the plurality of second target objects respectively; and
establishing a behavior database according to a plurality of file names of the plurality of second target objects, the plurality of second default labels and the plurality of behavior data; and
the analysis procedure comprises a static stage and a dynamic stage, wherein
the static stage comprises:
generating a first candidate label according to a file name of the target object; and
generating a second candidate label according to a target behavior and a target context of the target object; and
the dynamic stage comprises:
generating a third candidate label according to the target object and a testing script;
wherein generating the second candidate label according to the target behavior and the target context of the target object comprises:
obtaining a plurality of entries from the behavior database according to the target behavior, wherein the behavior data of each of the plurality of entries is identical to the target behavior;
extracting at least one keyword from the target context according to the plurality of second default labels of the plurality of entries, wherein said at least one keyword is identical to one of the plurality of second default labels of the plurality of entries; and selecting at least one of the plurality of second default labels to be served as the second candidate label according to said at least one keyword.

12. A system for generating security policy of operating system adapted a plurality of target objects of a target operating system, wherein each of the target object has a target attribute, and the system comprises:
a non-transitory machine readable storage medium storing a plurality of instructions; and
at least one processing device electrically connecting to the non-transitory machine readable storage medium, wherein said at least one processing device performs the plurality of instructions and triggers a plurality of operations, and the plurality of operations comprises:
generating a default label by a labeling tool according to the target attribute;
obtaining a reference object of a reference operating system, wherein the reference object has a reference attribute and a reference label;
comparing whether the target attribute and the reference attribute are identical and generating a comparison result;
labeling each of the plurality of target objects with the default label, the reference label, or one of a plurality of candidate labels according to the comparison result and a type of the target object;
performing a booting testing script by the target operating system to generate a plurality of system audit messages; and
converting the plurality of system audit messages to a plurality of rules according to a policy generator and collecting the plurality of rules to form a security policy;
wherein labeling the target object with the default label, the reference label, or said one of the plurality of candidate labels according to the comparison result and the type of the target object comprises:
labeling the target object with the reference label when the comparison result shows that the target attribute and the reference attribute are identical;
determining whether the type of the target object is program when the comparison result shows that the target attribute and the reference attribute are different;
labeling the target object with the default label when the type of the target object is not program; and
performing an analysis procedure to generate the plurality of candidate labels when the type of the target object is program, and selecting said one of the plurality of candidate labels according to an accessed number corresponding to each of the plurality of candidate labels to label the target object;
wherein the target object is a first target object, the default label is a first default label, the target operating system further comprises a plurality of second target objects, and
before performing the analysis procedure, the method further comprises:
labeling the plurality of second target objects with a plurality of second default labels respectively by the labeling tool;
analyzing a plurality of behavior data of the plurality of second target objects respectively; and
establishing a behavior database according to a plurality of file names of the plurality of second target objects, the plurality of second default labels and the plurality of behavior data; and
the analysis procedure comprises a static stage and a dynamic stage, wherein
the static stage comprises:
generating a first candidate label according to a file name of the target object; and
generating a second candidate label according to a target behavior and a target context of the target object; and
the dynamic stage comprises:
generating a third candidate label according to the target object and a testing script;
wherein generating the second candidate label according to the target behavior and the target context of the target object comprises:
obtaining a plurality of entries from the behavior database according to the target behavior, wherein the behavior data of each of the plurality of entries is identical to the target behavior;
extracting at least one keyword from the target context according to the plurality of second default labels of the plurality of entries, wherein said at least one keyword is identical to one of the plurality of second default labels of the plurality of entries; and
selecting at least one of the plurality of second default labels to be served as the second candidate label according to said at least one keyword.

* * * * *